(12) United States Patent  
Early et al.

(10) Patent No.: US 6,351,579 B1
(45) Date of Patent: Feb. 26, 2002

(54) OPTICAL FIBER SWITCH

(75) Inventors: James W. Early, Los Alamos; Charles S. Lester, San Juan Pueblo, both of NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/259,749

(22) Filed: Feb. 27, 1999

Related U.S. Application Data

(60) Provisional application No. 60/076,301, filed on Feb. 27, 1998.

(51) Int. Cl.$^7$ ................................................. G02B 6/26
(52) U.S. Cl. .............................. 385/18; 385/16; 385/17; 385/7
(58) Field of Search ............................... 385/16, 17, 18, 385/6–8, 33, 47; 250/231.1, 206; 356/351, 352; 372/10, 26; 359/122

(56) References Cited

U.S. PATENT DOCUMENTS

| | | | | |
|---|---|---|---|---|
| 3,532,890 A | * | 10/1970 | Denton | 359/122 |
| 4,059,759 A | * | 11/1977 | Harney et al. | 250/206 |
| 4,631,402 A | * | 12/1986 | Nagatsuma et al. | 250/231.1 |
| 5,090,824 A | * | 2/1992 | Nelson et al. | 385/16 |
| 5,197,074 A | * | 3/1993 | Emmons, Jr. et al. | 372/26 |

* cited by examiner

Primary Examiner—Frank G. Font
Assistant Examiner—Sang H. Nguyen
(74) Attorney, Agent, or Firm—Gemma Morrison Bennett

(57) ABSTRACT

Optical fiber switches operated by electrical activation of at least one laser light modulator through which laser light is directed into at least one polarizer are used for the sequential transport of laser light from a single laser into a plurality of optical fibers. In one embodiment of the invention, laser light from a single excitation laser is sequentially transported to a plurality of optical fibers which in turn transport the laser light to separate individual remotely located laser fuel ignitors.

The invention can be operated electro-optically with no need for any mechanical or moving parts, or, alternatively, can be operated electro-mechanically. The invention can be used to switch either pulsed or continuous wave laser light.

19 Claims, 5 Drawing Sheets

OPTICAL FIBER SWITCH

This application claims benefit to U.S. provisional application No. 60/076,301 filed Feb. 27, 1998.

This invention was made with government support under Contract No. W-7405-ENG-36 awarded by the U.S. Department of Energy. The government has certain rights in the invention.

TECHNICAL FIELD

This invention relates to laser light switching technology.

BACKGROUND ART

Optical fiber laser light switching devices currently used generally rely upon rotating or moving mirrors or translating optical fibers to permit the selective injection of high peak power laser light into multiple fibers. These devices typically have lack of reproducibility in the alignment of focused laser light onto the faces of the optical fibers, leading to laser energy losses or optical damage to the optical fiber ends. Since they contain moving mechanical parts, the lifetimes of these devices are limited and they eventually fail due to mechanical wear. Also, electro-optical laser light switching devices that depend upon waveguide technology have speeds which are limited by the time required for deformation and recovery of a piezoelectric crystal (many milliseconds); thus, the rate at which light can be switched from one fiber to another is similarly limited.

There is a need for faster, more durable, accurate, reliable optical fiber switching devices with high power light handling capabilities.

Therefore it is an object of this invention to provide a method and apparatus for laser light optical fiber switching.

It is also an object of this invention to provide a method and apparatus for laser light optical fiber switching which can be used for sequential energizing of optical ignitors for aviation turbine engines.

It is another object of this invention to provide a method and apparatus for laser light optical fiber switching which can be used for sequential ignition of more than one internal combustion fuel engine cylinder.

It is yet another object of this invention to provide a method and apparatus for laser light optical fiber switching which does not require use of waveguide technology.

It is a further object of this invention to provide a method and apparatus for laser light optical fiber switching which is useful for communications industry applications.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims and is intended to cover all changes and modifications within the spirit and scope thereof.

DISCLOSURE OF INVENTION

To achieve the foregoing and other objects, and in accordance with the purposes of the present invention, as embodied and broadly described herein, there has been invented a device which employs an alternating sequence of laser light modulators, such as Pockels cells, and laser light polarizers to distribute laser light for injection into a plurality of optical fibers. This invention is particularly useful for sequential ignition of a number of internal combustion engine cylinders or turbine engine ignitors.

In the present invention an optical fiber laser light switching device has at least one laser light modulator positioned and operated so as to direct light from a laser into at least one laser light polarizer which either transports or rejects the laser light depending upon the polarization of the laser light, with laser light reflecting mirrors positioned so as to direct the rejected light through a first focusing lens into a first optical fiber and a second focusing lens to focus the laser light transported by the polarizer into a second optical fiber.

Alternatively, laser light distribution can be controlled mechanically rather than electro-optically by using waveplates to change the linear polarization of the laser light.

The invention also provides for laser light switching by:
(a) directing laser light from a laser through a laser light modulator;
(b) applying a voltage to the laser light modulator intermittently in accordance with signals from a timing module, thereby controlling the polarization of the laser light;
(c) directing the laser light from the laser light modulator into a laser light polarizer which either rejects or transports the laser light according to whether or not the laser light has been appropriately polarized by the laser light modulator;
(d) directing any the laser light which is rejected by the laser light polarizer through a first focusing lens into a first optical fiber;
(e) directing any of the laser light which is transported by the laser light polarizer through a second focusing lens into a second optical fiber;
thereby sequencing injections of laser light into a plurality of optical fibers.

The invention can be operated electro-optically with no need for any mechanical or moving parts, or, alternatively, can be operated electro-mechanically. The invention can be used to switch either pulsed or continuous wave laser light.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

BEST MODES FOR CARRYING OUT THE INVENTION

Figure 1:
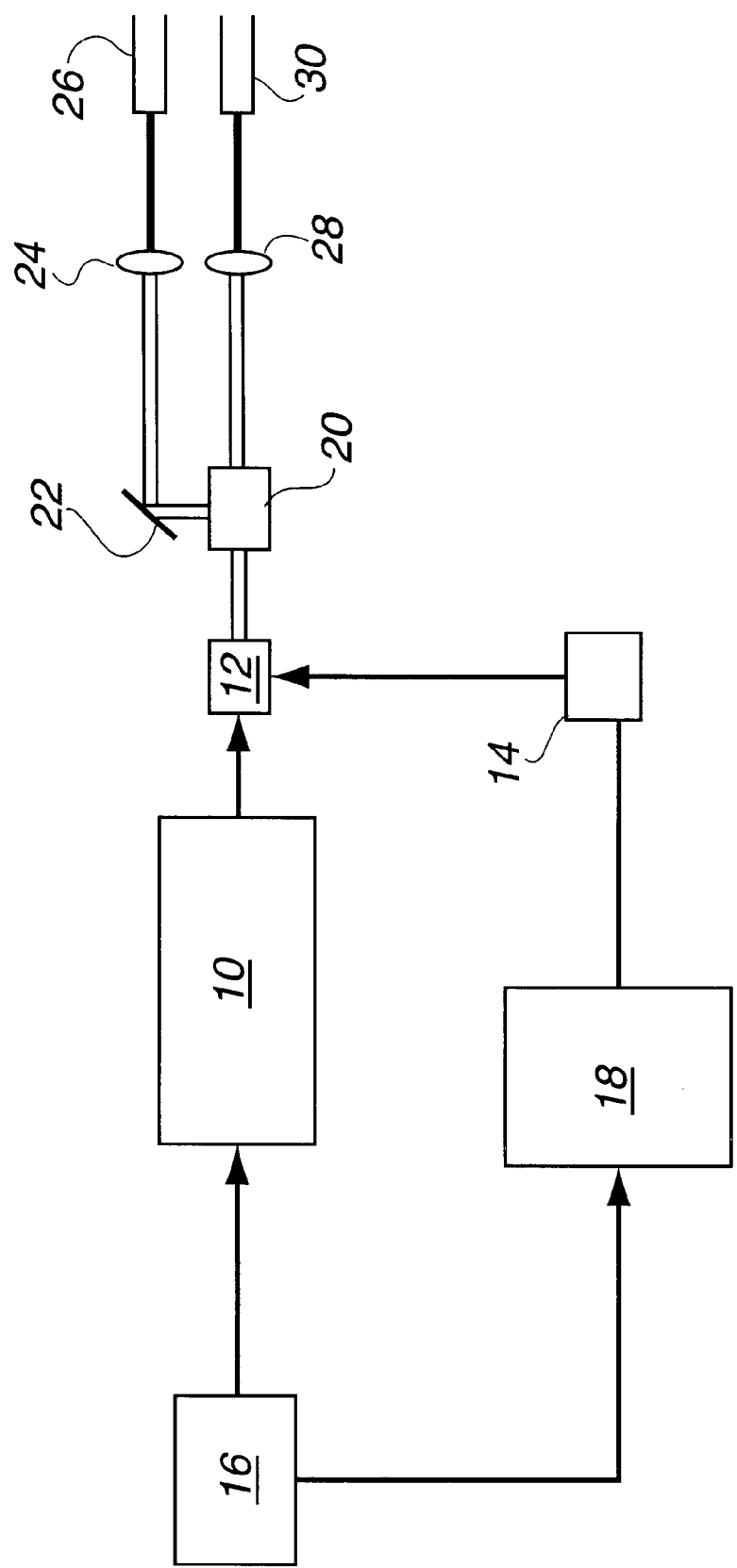
FIG. 1 is a schematic of an electro-optical laser light optical fiber switching system in accordance with an embodiment of the present invention.

In the present invention, an optical fiber switch operated by electrical activation of at least one laser light modulator paired with at least one laser light polarizer is used for the sequential injection of laser light from a single laser into a plurality of optical fibers for transport to a number of devices where it is desired to deliver a laser beam.

The invention comprises an alternating series of at least one laser light modulator and at least one laser light polarizer arranged so as to direct linearly polarized laser light beams from a laser first through at least one laser light modulator. The laser light modulator is intermittently activated in accordance with signals from a timing module and firing sequence controller. The polarization state of the light leaving the laser light modulator is controlled by application of the voltage (or other electrical field) to the material of the laser light modulator. Thus the laser light modulator provides the means for rotating the polarization of linearly polarized laser light entering the electro-optic laser light modulator from vertical to horizontal polarization and back.

Although Pockels cells are presently preferred as laser light modulators in the practice of the invention, Kerr cells or Faraday cells could also be used. The character of the electrical field and voltage useful in the invention will depend upon the type of laser light modulator employed.

For example, when using a Pockels cell, in order to achieve a full 90-degree rotation of the polarization of the laser light beam, a voltage equivalent to the half-wave voltage for the crystal in a Pockels cell is applied to the Pockels cell. More specifically, for example, if the Pockels cell crystal is lithium niobate, approximately 3.0 kV must be applied to a laser light beam having a wavelength of 1064 nm to rotate the laser light polarization 90 degrees.

Light from the laser light modulator is then directed into at least one light polarizer which can accept or reject the laser light depending upon the polarization of the laser light beam arriving at the light polarizer. The polarizers are used as polarization dependent reflecting mirrors by analyzing the polarization state of the laser light entering the light polarizer and directing the laser light in a manner that depends upon the polarization of the light. For instance, the polarizer may be oriented so that vertically polarized light arriving at the light polarizer is transported through the light polarizer with no change in propagation direction while horizontally polarized light arriving at the light polarizer, on the other hand, is rejected by the light polarizer and deflected at an angle of nearly 90 degrees from its original direction by the light polarizer. The light polarizer thus provides the means to divert laser light from a straight-line trajectory. The light polarizer or polarization analyzer is controlled by the polarization altering action of the laser light modulator through which the light passes prior to entering the light polarizer.

Laser light ejected from each polarizer is collected and focused onto the face of an optical fiber positioned at the focal point of a short focal length lens. Light injected into the optical fiber is then carried to a remote location through the length of the fiber. In applications where the optical fiber switch is used for combustion engine ignition, the remote locations are the individual cylinders.

The optical switching system of this invention can be used to sequentially distribute continuous wave or pulsed laser beams in a very broad range of wavelengths from about 700 nm to about 12,000 nm. The most useful wavelengths will depend upon the intended application. For example, for laser ignition applications, use of laser light wavelengths in the range from about 700 nm to about 1100 nm is presently preferred if an infrared solid state laser is used. In a more specific example, when the invention is used for sequencing and transporting a laser beam from an excitation laser to several small ignition lasers, as described in U.S. patent application Ser. No. 08/861,214 filed May 21, 1997, an 808 nm beam frequently is used.

Voltage as high as 2500 volts is usually employed, with voltages in the range from about 1000 volts to about 3500 volts generally considered most useful in the practice of the invention, depending upon the size of the crystal in the Pockels cells and upon the type of electro-optic modulator crystal used. The voltage pulses to the laser light modulators must be at least as long as the laser pulses if the laser is operated in a pulsed mode.

Which lasers are suitable for use in the practice of this invention will depend upon the intended use of the laser light after transport through the plurality of optical fibers. For applications in which the sequenced, distributed laser light is used for preheating fuel (as would be done when practicing the invention of U.S. patent application Ser. No. 08/656,110 filed May 31, 1996), and/or activating ignition lasers for ignition of hydrocarbon fuel (as would be done in practicing the invention of U.S. patent application Ser. No. 08/861,214 filed May 21, 1997), suitable lasers usually include Er:YAG lasers operating at a wavelength which is readily absorbed by the fuel hydrocarbons.

Various lasers with light output which can be frequency mixed to produce harmonic light within wavelengths which are readily absorbed by the fuel also can be used. For applications which require high peak power pulses, Er:YAG or Nd:YAG lasers, or any other type of laser which can operate in the Q-switched, mode-locked or cavity-dumped mode can be used.

Pockels cells useful as laser light modulators in the present invention generally have crystals that exhibit the Pockels effect with ring electrodes bonded to two faces to allow application of an electrical field to the crystal. Crystals which can be used in the practice of this invention are those which provide a clear aperture large enough to transmit laser light and which do not absorb at the laser wavelength. These include, but are not limited to, crystals such as lithium niobate, potassium dihydrogen phosphate, or ammonium dihydrogen phosphate. Lithium niobate crystals are generally presently preferred because these crystals have very low absorbance to laser light at visible and near infrared wavelengths and possess low half-wave voltage.

Crystals as small as 1 mm or as large as 15 cm in cross section can be used. Generally, crystal volumes in the range from about 1 $mm^3$ to about 10 $cm^3$ are most useful in the practice of the invention. Commercially available Pockels cells may be used in the invention.

Laser light polarizers or light polarization analyzers that are useful in the present invention are those which can analyze the polarization state of incoming laser light and direct or redirect the laser light in accordance with the polarization of the incoming laser light. Several useful laser light polarizers are commercially available as Glan Thompson, Glan-Laser or Thin Film Dielectric laser light polarizers. Glan-Laser polarizers are presently preferred because Glan-Laser polarizers are very selective to polarization state with an extinction ratio of $10^4:1$ and are highly transmissive to visible or infrared radiation.

Lenses which are useful in the practice of this invention generally are those which are of sufficiently long focal length to provide a collimated light beam or long depth of field.

Several reflecting mirrors are used to direct the modulator output and to redirect or to reverse the direction of light propagation through the pairs of laser light modulators and polarizers.

FIG. 1 is a schematic of an example of an optical fiber switching system in accordance with the invention for use as multiplexer of pulsed infrared laser light used to initiate the ignition of aerosol fuels in aviation combustors. The laser pulses are directed to either one of the two output ports in a randomly selectable manner.

As shown in FIG. 1, vertically polarized light output from a laser 10 is directed into a Pockels cell 12 which functions as a laser light modulator. Voltage from a power source 14 is applied to the Pockels cell 12 so that horizontally polarized laser light is output from the Pockels cell 12. A timing module 16 is connected to both the laser 10 and a firing sequence controller 18 which activates the power source 14 and the Pockels cell 12 for the selected intervals.

The horizontally polarized laser light from the Pockels cell 12 is then directed into a laser light polarizer 20, where it is either rejected (and thus directed into a light turning reflecting mirror 22 then through a first focusing lens 24 into a first optical fiber 26) or, if not rejected, directed through a second, or other, focusing lens 28 into a second optical fiber 30, depending upon polarization of the light.

An electro-optic modulator similar to the one in this embodiment but utilizing two Pockels cells and two polarization analyzers, providing 3 output channels was demonstrated in the laboratory and was operated at switching speeds up to 30 Hz.

In one embodiment of the invention, laser light from a single excitation laser is sequentially injected by the optical fiber switching system into each of a plurality of optical fibers, each of which in turn transports the laser light to separate individual remotely located Nd:YAG laser fuel ignitors.

Figure 2:
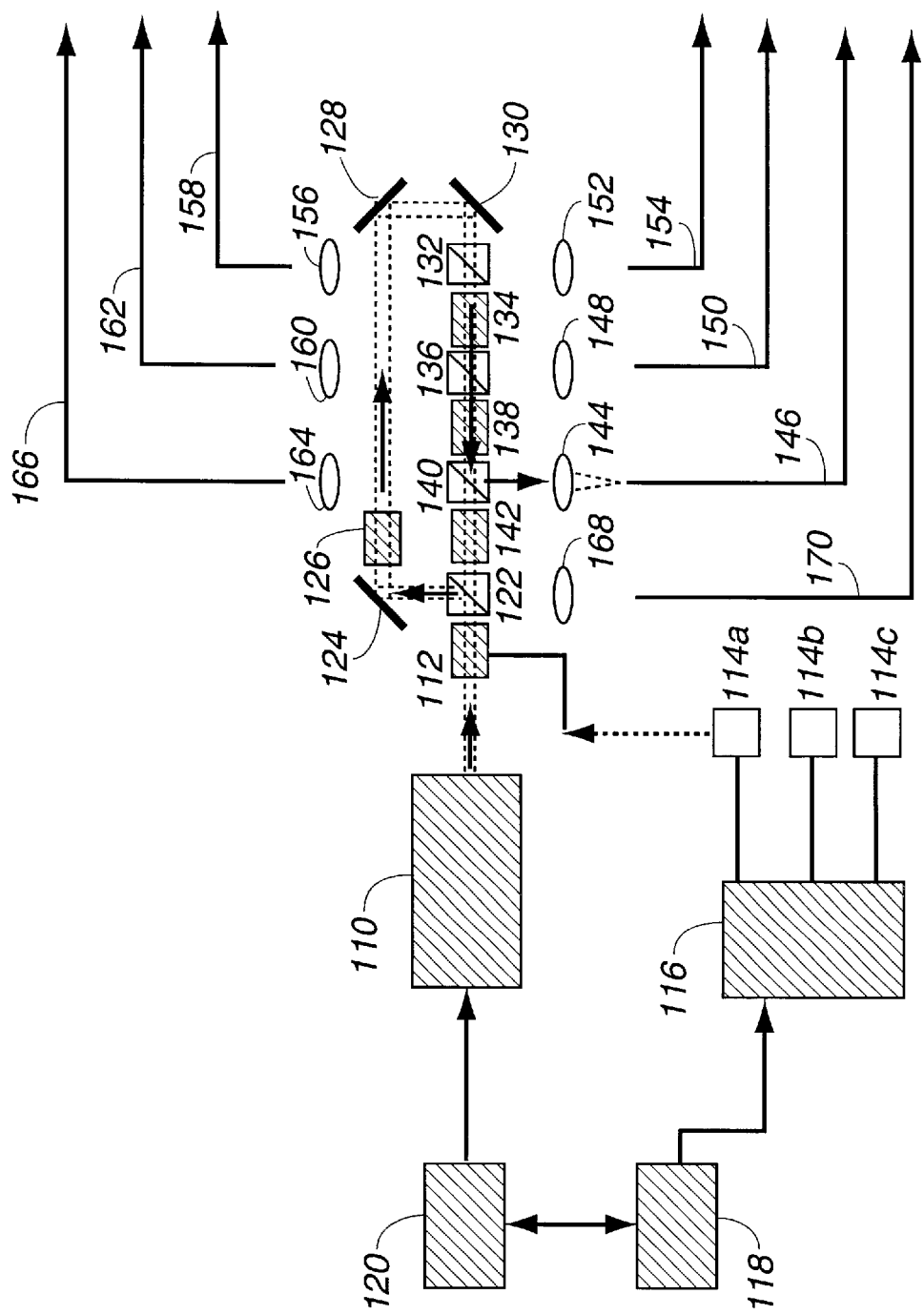
FIG. 2 is a schematic of an electro-optical laser light optical fiber switching system arranged to sequentially inject laser light into seven different optical fibers in accordance with an embodiment of the present invention.

The schematic of FIG. 2 shows a configuration for the invention capable of sequentially distributing laser light among each of seven optical fibers depending upon which of the Pockels cells within the system are activated at any given time by the application of a voltage. The embodiment of the invention shown in FIG. 2 nearly doubles the number of optical fibers to which the laser light can be switched with the addition of each single Pockels cell.

With reference to FIG. 2, a laser 110 produces a beam which is directed into a first Pockels cell 112 which functions as a laser light modulator. The Pockels cell 112 is activated by a power source 114a as directed by a firing sequence controller 116 which is electrically connected to two timing modules 118 and 120. Each subsequent Pockels cell has its own power supply 114b, 114c, . . . , the output voltage of which is controlled by the firing sequence controller 116. As the timing modules 118 and 120 permit a pulse of voltage to the Pockels cell 112 corresponding in time with the time of a laser pulse from the laser 110, a pulse of polarized laser light is rotated by the Pockels cell 112 and directed to a light polarizer 122. If the polarization of the initially vertically polarized laser light pulse has been rotated 90° to become horizontally polarized, it is rejected by the polarization analyzer 122, and redirected to a light reflecting mirror 124. The reflecting mirror 124 is positioned so as to direct any laser light pulses it receives into a second Pockels cell 126 where the reflected laser light pulse is changed in polarization once more, and directed by way of two more reflecting mirrors 128 and 130 into a series of alternating polarizers 132, 136, 140 and Pockels cells 134, 138, and 140.

If the laser light pulse received by the first laser light polarizer 122 is not polarized 90°, but is simply transported because the Pockels cell 112 had not been activated, then the laser light polarizer 122 does not reject the light and transmits the pulse directly into a Pockels cell 142 aligned with and subsequent to the polarizer. The laser light pulses received by the subsequent Pockels cell 142 are then processed in the same manner as light pulses received in the first Pockels cell 112.

In the configuration shown in FIG. 2, laser light can be extracted from either the top or bottom (with reference to the figure) of each polarizer 122, 132, 136, or 140. Laser light ejected from each polarizer 122, 132, 136 or 140 is collected and focused onto the face of an optical fiber positioned at the focal point of a short focal length lens. Light injected into the optical fiber is then carried to a remote location through the fiber length.

The heavy arrows on the drawing depict the path of a laser beam which is rotated 90° by the first Pockels cell 112, redirected 90° by the first polarizer 122 into the turning mirror 124, thence into a second Pockels cell 126. The second Pockels cell was also activated so a vertically polarized beam passed into reflecting mirrors 128 and 130, which directed the beam unrotated through alternating polarizers 132, 136 and Pockels cells 134 and 138 into polarizer 140. If Pockels cell 140 were activated, the beam would be rejected and redirected 90° through a short focal length lens 144 into a fiber optic 146 that transports the beam to a remote location.

At other moments in time, other ones of the Pockels cells are activated according to the sequences mandated by the firing sequence controller, rotating the polarization of the beam at different ones of the Pockels cells so that the beam is rejected by the associated polarizer and thus injected into different ones of the fiber optic lines in accordance with the firing sequence.

In another configuration of the invention a laser light multiplexer provides a mechanically driven alternative to the electro-optically controlled laser light distribution system of the first described embodiments. The mechanically driven alternative is substantially similar to the electro-optically controlled embodiments of the invention, except for the manner in which the light polarization changes are achieved. In both the mechanical and electro-optical embodiments of the invention, the laser beam path within the optical fiber switch is controlled by changing the laser light polarization so that the laser light will be ejected in a selected direction from one of several analyzing polarizers within the path of the laser light through the optical fiber switching system. Light ejected from the polarizer is directed through a focusing lens for injection into the selected optical fiber.

The mechanically controlled system uses movable half-wave plates which can be taken in and out of the laser beam path in order to change the laser light polarization at the proper point within the optical fiber switching system. When a waveplate is in the laser beam, the laser light polarization is rotated by 90° so that horizontally polarized light becomes vertically polarized and vice versa. Another mechanical means of changing the polarization is to simply rotate the waveplate by 90 degrees while the waveplate remains continuously within the laser beam.

The presently preferred practice is to insert or remove the waveplate from the laser beam by a rotary motion. Rotary movement of the waveplate can be performed rapidly and can accurately reproduce the angular alignment of the waveplate with respect to the polarization of the incident laser light.

There are several means for inserting and removing the halfwave plates from the laser light including rotating or translating the waveplate out of the beam.

Figure 3:
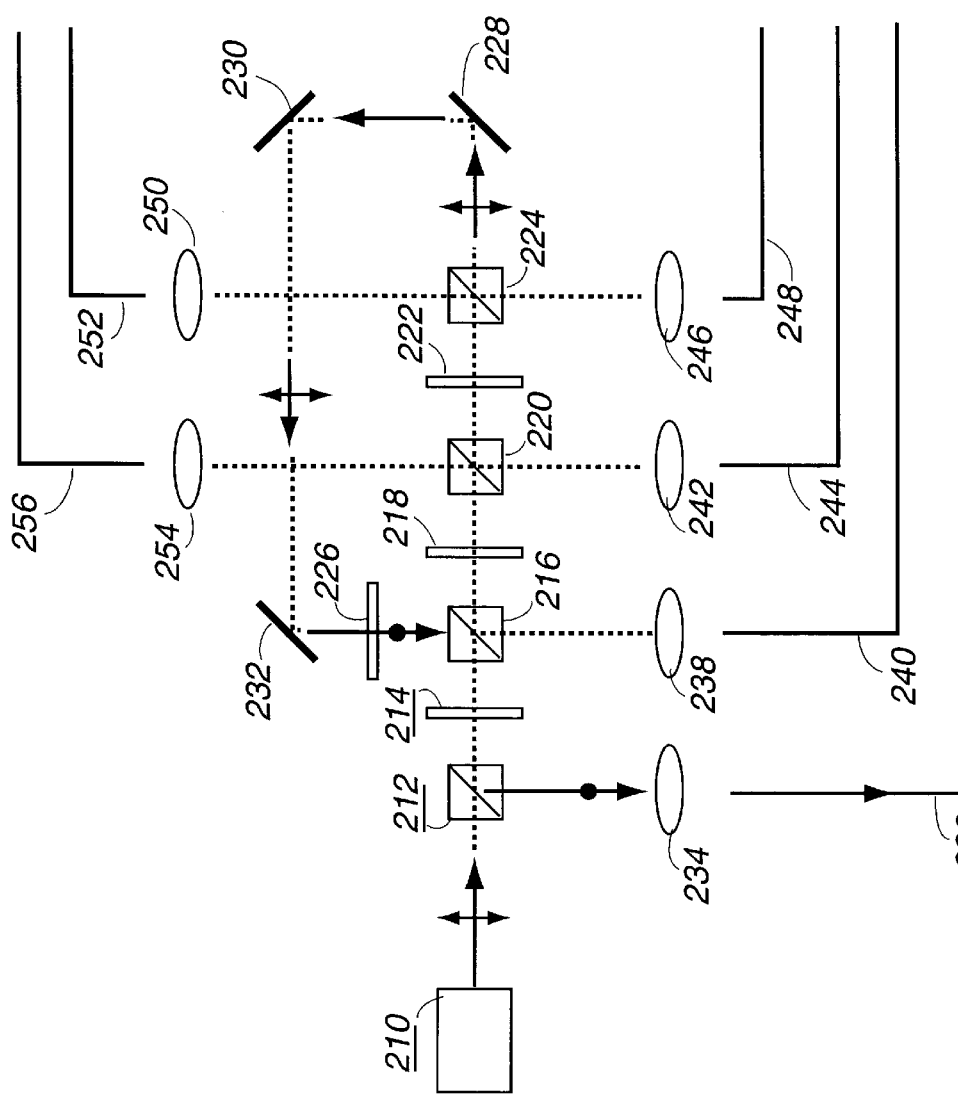
FIG. 3 is a schematic of a laser light multiplexer arrangement in accordance with an embodiment of the present invention.

The actuation of a mechanical optical fiber light switch with a six-port distribution system distributor is schematically shown in FIG. 3.

With reference to the schematic diagram of FIG. 3, light from a laser 210 is directed into a first polarization analyzer 212 which assures the correct polarization of the laser light (horizontal in this case, as shown by the up-down oriented arrow).

In a manner analogous to that described in the electro-optical embodiments of the invention, alternating polarization analyzers and waveplates are set up in a beam pathway. An embodiment using four polarization analyzers 212, 216, 220 and 224; and four waveplates 214, 218, 222 and 226 is shown in FIG. 3. Laser light from the first polarization analyzer 212 is then directed past waveplate 214 into a second polarization analyzer 216. With all waveplates being rotated out of the laser beam path except for waveplate 226, the beam travels straight through each polarization analyzer.

The laser light then takes the path through the optical switch indicated by the dark arrows. The polarization of the laser light is also indicated at various points within the system. Light double ended arrows drawn through the dark arrows indicate horizontal polarization. A dark dot through the laser light direction arrow indicates vertical polarization.

All polarization analyzers 212, 216 and 220 transmit the horizontally polarized light. The laser light is reflected by mirrors 228, 230 and 232 so that the laser beam is finally incident upon waveplate 226. Waveplate 226 rotates the polarization of the laser light from horizontal to vertical. Subsequently the laser light is then rejected by polarization analyzers 216 and 212 so that the laser light is directed sequentially to focusing lens 234 and optic fiber 236.

When other waveplates are moved into the path of the polarized beam and the polarization of the laser light is rotated, then the beam is directed into the lens 238 242, 246, 250 or 254 and fiber optic line 240, 242, 246, 252 or 256 associated with the next polarization analyzer the beam encounters.

Figure 4:
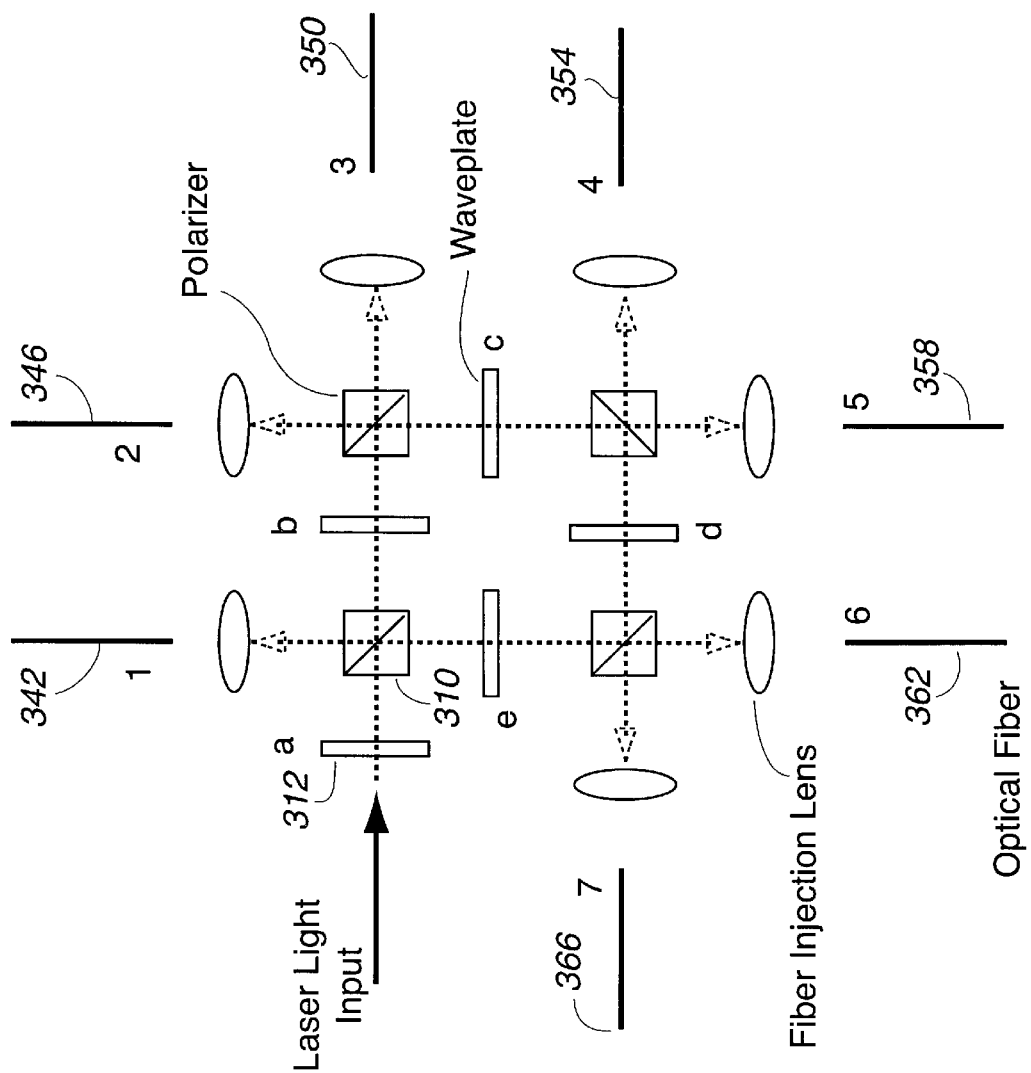
FIG. 4 is a schematic of a laser light switching system in accordance with a mechanically operated embodiment of the present invention.

FIG. 4 is a schematic diagram of a mechanically actuated laser light optical switch set up to operate in accordance with another embodiment of the invention. The mechanically actuated laser light optical switch shown in FIG. 4 is a very compact laser light optical switch. The three reflecting mirrors used in the embodiment shown in FIG. 3 have been eliminated and the path of the light is determined strictly by the internal reflective characteristics of the polarizer cubes.

With reference to FIG. 4, Table I, indicates which waveplates which must be inserted within the laser beam path to provide light output to the selected optical fiber.

TABLE I

Waveplate Positions for Distribution of Laser Light to Optical Fibers[a]

| Output Fiber | Waveplates Inserted in Beam |
|---|---|
| 342 | b & e |
| 346 | a & c |
| 350 | none |
| 354 | a & d |
| 358 | b & c |
| 362 | a & e |
| 366 | b & d |

[a]With reference to the schematic of FIG. 4.

Figure 5:
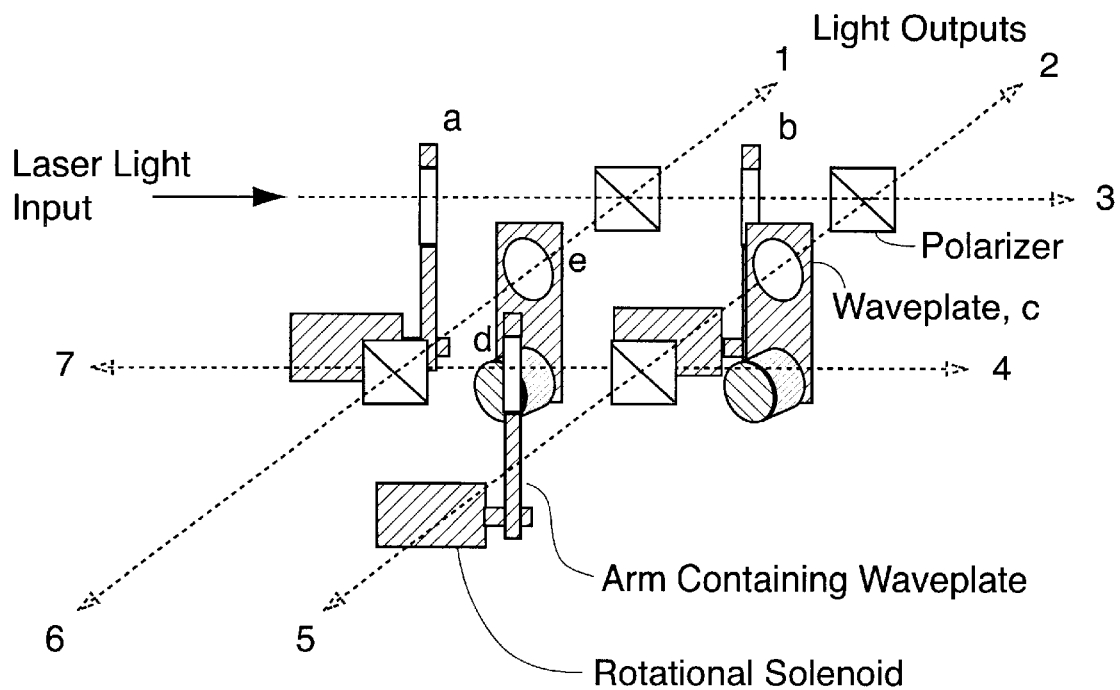
FIG. 5 is a view of two waveplate positions in accordance with a mechanically operated embodiment of the present invention.

A three-dimensional view of the embodiment of the invention shown in FIG. 4 is shown in FIG. 5. Here, the waveplates are shown mounted in a thin (3 mm thick) rectangular holder which is attached to the shaft of a rotational solenoid. The rotational solenoid is used to rotate the waveplate into the laser beam path by energizing the solenoid.

Figure 6:
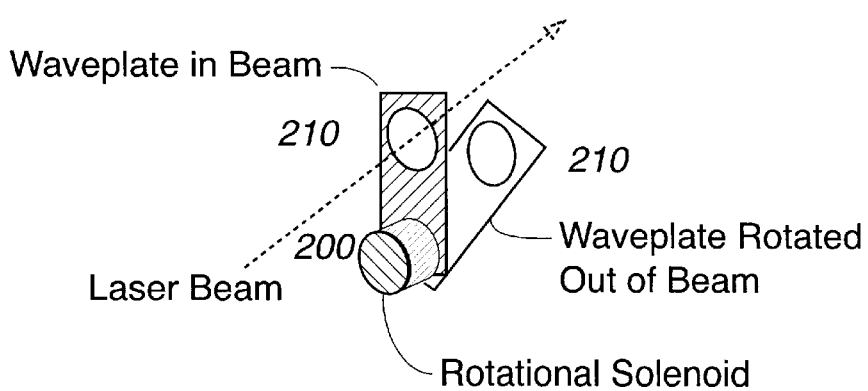

FIG. 6 shows two waveplate positions. The angular displacement of the waveplate allows the waveplate to be either positioned within the laser beam or to be removed from the laser beam. A rotational solenoid 200 turns the waveplate 210 into the positions according to the degree of rotation of the solenoid.

The major differences between the electro-optical and mechanically actuated optical switching systems of this invention are the switching speed and cost. Although output port switching speeds for the mechanically activated optical switch are considerably slower than those for the electro-optically driven system (1 kHz), switching rates in excess of 20 Hz are achievable.

Alignment stability for the mechanically activated optical switches of this invention is as good as that of the electro-optical systems of this invention since axial motions of the waveplate due to mechanical play in the driving solenoid are small enough not to cause misalignments in the laser light to be injected into the optical fibers.

Because the physical process of the present invention relies upon polarization of the laser light rather than changes in the refractive indices of light passing through a crystal, switching speeds of the present invention are limited only by the recovery time of the electro-optic crystals of the Pockels cell between polarization states. Therefore, very high switching rates as fast as 1 kHz (compared to 10 Hz in state of the art devices) can be achieved by this invention.

While the apparatuses and methods of this invention have been described in detail for the purpose of illustration, the inventive apparatuses and methods are not to be construed as limited thereby. This patent is intended to cover all changes and modifications within the spirit and scope thereof.

INDUSTRIAL APPLICABILITY

The high switching rates of the invention enable such applications as the laser ignition of multiple cylinder internal combustion engines and the multiple ignitor stabilization of combustion within turbine engine combustors. Other applications include use of the invention for initiation of projectile propellants for multiple barreled guns and artillery, multiple weapon arrays, artillery and communications industry technology.

What is claimed is:

1. An apparatus for optical switching comprising:
   (a) at least one laser light modulator positioned so as to direct light from a laser into at least one laser light polarizer;
   (b) at least one laser light reflecting mirror positioned so as to direct laser light rejected by said at least one laser light polarizer through a first focusing lens into a first optical fiber;
   (c) at least one other lens positioned so as to direct laser light transported by said at least one laser light polarizer into a second optical fiber; and
   (d) a timing module, a firing sequence controller and a power supply connected so as to control activation of said laser light modulator.

2. An apparatus as recited in claim 1 wherein said laser light modulator is selected from the group of Pockels cells, Kerr cells and Faraday cells.

3. An apparatus as recited in claim 1 wherein said laser light modulator is a Pockels cell.

4. An apparatus as recited in claim 3 wherein said Pockels cell has a crystal selected from the group of lithium niobate, potassium dihydrogen phosphate and ammonium dihydrogen phosphate crystals.

5. An apparatus as recited in claim 4 wherein said crystal is a lithium niobate crystal.

6. An apparatus as recited in claim 4 wherein said crystal is in the range from about 1 mm to about 15 cm in cross section.

7. An apparatus as recited in claim 1 wherein said laser is one selected from the group of a Q-switched Er:YAG and a Nd:YAG laser.

8. An apparatus as recited in claim 1 having a plurality of laser light modulators and laser light polarizers positioned in alternating sequence.

9. An apparatus for optical switching comprising:
(a) a laser positioned to direct light into at least one laser light polarizer;
(b) at least one waveplate moveably mounted in the path of output from said at least one laser light polarizer;
(c) at least one laser light reflecting mirror positioned so as to direct laser light rejected by said at least one laser light polarizer through a first focusing lens into a first optical fiber;
(d) at least one other lens positioned so as to direct laser light transported by said at least one laser light polarizer into a second optical fiber; and
(e) a timing module, a firing sequence controller and a power supply connected so as to control activation of said laser light modulator.

10. An apparatus as recited in claim 9 further comprising a rotational solenoid connected to each of said at least one waveplates.

11. An apparatus as recited in claim 9 having a plurality of said laser light polarizers and laser light waveplates alternately sequenced.

12. A method of laser light switching comprising:
(a) directing laser light from a laser through a laser light modulator;
(b) applying a voltage to said laser light modulator intermittently in accordance with signals from a timing module, thereby controlling polarization of said laser light;
(c) directing said laser light from said laser light modulator into a laser light polarizer which either rejects or transports said laser light according to whether or not said laser light has been polarized by said laser light modulator;
(d) directing any said laser light which is rejected by said laser light polarizer through a first focusing lens into a first optical fiber;
(e) directing any said laser light which is transported by said laser light polarizer through a second focusing lens into a second optical fiber;
thereby sequencing injections of laser light into a plurality of optical fibers.

13. A method as recited in claim 12 wherein said laser light modulator rotates polarization of said laser light through sufficient angle to remove said laser from beam path.

14. A method as recited in claim 13 wherein said laser light modulator rotates polarization of said laser light 90 degrees.

15. A method as recited in claim 12 wherein voltage in the range from about 1000 volts to about 3500 volts is applied to said laser light modulator.

16. A method as recited in claim 12 wherein steps (a) through (e) are repeated a plurality of times using a plurality of laser light modulators and laser light polarizers in alternating sequence.

17. A method as recited in claim 12 wherein said laser light switching is used in an apparatus for igniting fuels.

18. A method as recited in claim 12 wherein said laser light switching is used in an apparatus for igniting propellants.

19. A method as recited in claim 12 wherein said laser light switching is used in an apparatus for igniting explosives.

* * * * *